F. D. THOMASON.
BRAKE EQUALIZING MECHANISM.
APPLICATION FILED MAR. 10, 1909.
944,058.
Patented Dec. 21, 1909.
2 SHEETS—SHEET 1.
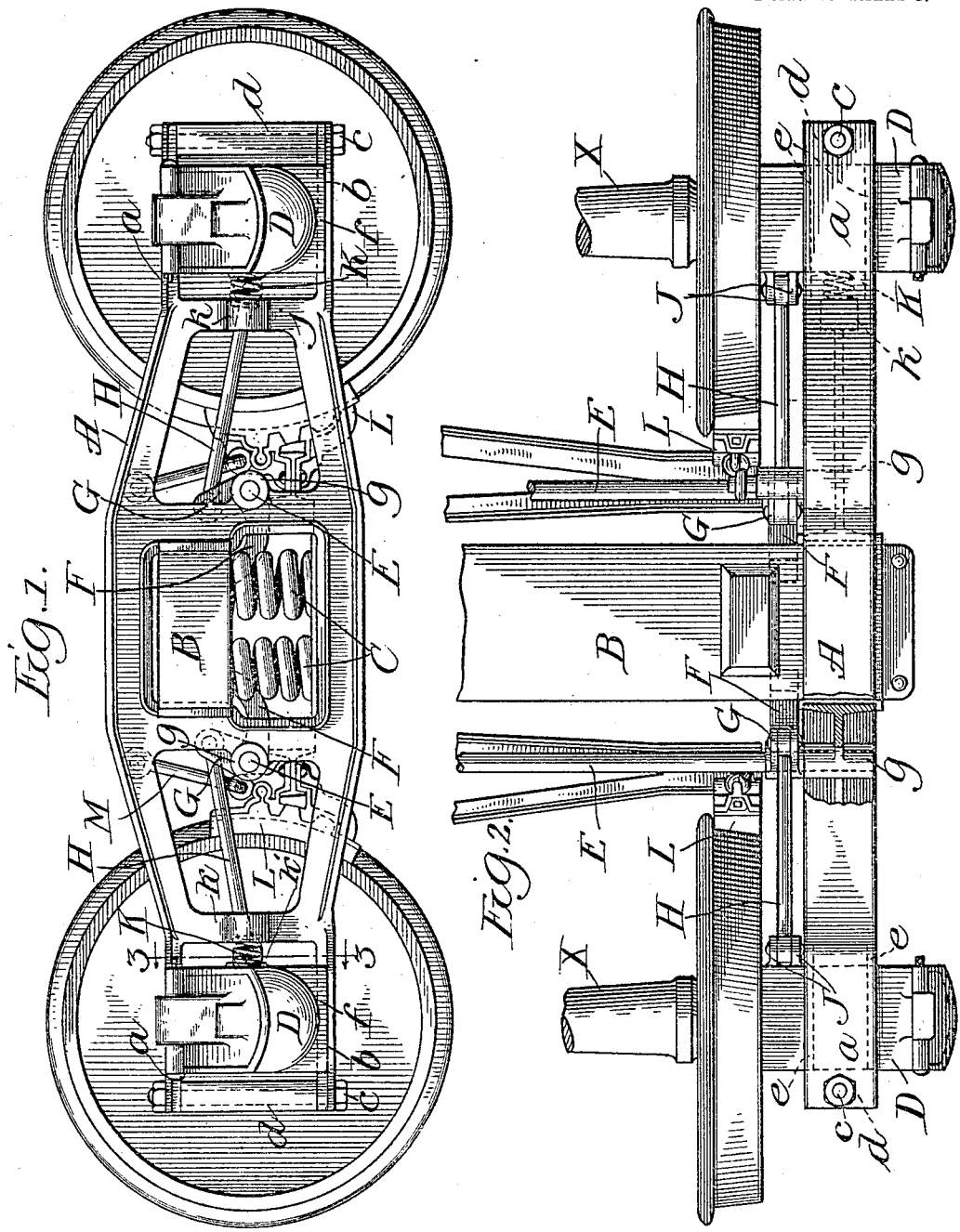
Witnesses
Inventor
Frank D. Thomason F. D. THOMASON.
BRAKE EQUALIZING MECHANISM.
APPLICATION FILED MAR. 10, 1909.
944,058.
Patented Dec. 21, 1909.
2 SHEETS—SHEET 2.
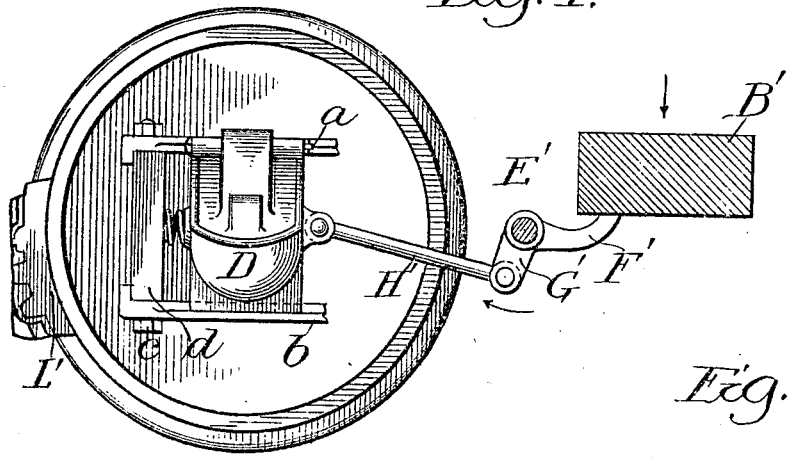
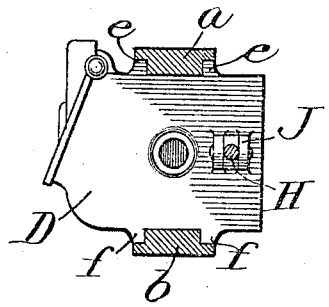
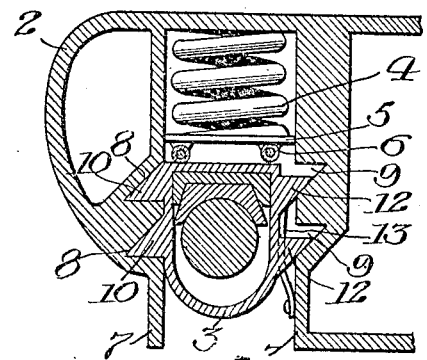
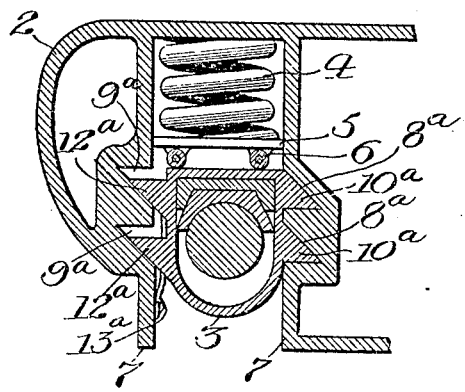
Witnesses
Inventor
Frank D. Thomason

UNITED STATES PATENT OFFICE.

FRANK D. THOMASON, OF CHICAGO, ILLINOIS.

BRAKE-EQUALIZING MECHANISM.

944,058.

Specification of Letters Patent.  Patented Dec. 21, 1909.

Application filed March 10, 1909.  Serial No. 482,540.

*To all whom it may concern:*

Be it known that I, FRANK D. THOMASON, a citizen of the United States, and a resident of Chicago, in the county of Cook and State of Illinois, have invented certain new and useful Improvements in Brake - Equalizing Mechanism, of which the following is a clear, full, and exact description.

One of the greatest difficulties experienced in the operation of trains, and particularly freight trains, is the equalization of the brake pressure upon the wheels of the cars composing the same. In order to simultaneously apply the brakes to the wheels of every car of the train, it is customary to maintain an air-pressure of about 20 pounds to the square inch throughout the same, and when the brakes are operated this pressure is exerted equally against the wheels of empty cars, as well as the wheels of loaded cars, which latter vary greatly in weight according to the nature and quantity of the commodity or material carried thereby. This pressure applied to the wheels of an unloaded or to lightly loaded cars will stop the wheels from revolving and cause them to skid or slide on the rails and this will not only wear flat places on the treads of the wheels but will cause the more heavily loaded cars in which the brake pressure is insufficient to stop the wheels, to bump into the empties and create a series of shocks and concussions throughout the train that is very damaging both to the structure of the cars and the draft rigging thereof.

The object of my invention is to provide a comparatively simple method of overcoming this difficulty, which can be applied either to cars having the ordinary diamond - frame car-trucks or cars having swing motion car-trucks or pedestal - trucks, regardless of whether the brakes engage the wheels at points nearest the bolster or central transom of the truck or at points diametrically opposite the same, and which can be depended upon to exert just the proper maximum braking pressure, automatically, according to the weight of the car-body and the load carried thereby, without stopping the wheels. This I accomplish by the means hereinafter fully described, and as more particularly pointed out in the claims.

In the drawings:—Figure 1 is a side view of a car - truck embodying my invention. Fig. 2 is a plan view of one side portion of the same. Fig. 3 is a transverse section taken on dotted line 3—3 of Fig. 1. Fig. 4 is a diagrammatical view showing, in elevation, a portion of a car-truck embodying a modification of my invention. Figs. 5 and 6 are, respectively, longitudinal sections of a fragment of a pedestal truck, showing a construction of the journal-boxes and jaws therefor embodying yet another modification of my invention.

The principle involved in my invention is based upon the automatic movement of the car-wheels toward the brake-shoes, according to the weight of the car and its load, regardless of the construction of the braking apparatus.

The truck shown in Figs. 1, 2, and 3 of the drawings embodies the preferred form of my invention. The side-frames A of this car-truck are, preferably, cast in one piece, and comprise upper and lower arch-bars and column guides, between which latter the ends of the truck-bolster B extend, and are supported by springs C seated upon the sill of the opening coming between said column-guides. The ends of the side-frames A extending beyond the vertical end webs $h$ thereof consist of an upper and lower straight horizontal portions, or jaws, $a$ and $b$, whose extremities are, preferably, connected by a bolt $c$, which, between said bars is surrounded by a spacing-sleeve $d$. The space between the vertical end web $h$ of the side-frame and the spacing-sleeves $d$ is greater in width than the width of the journal-box D, placed therein, and each journal-box is provided, in the vertical plane of the said jaws, $a$ and $b$, with transverse lugs $e, e$, projecting up from its upper surface and transverse lugs $f, f$, that project downward in the same transverse plane from its flat underside. These lugs embrace the contacting edges of said jaws and guide the transverse movement of the journal-boxes toward and from the brake-shoes. These journal - boxes, except in respect to those changes adapting them to move transversely, preferably, correspond in construction to the M. C. B. journal boxes. Just below the horizontal plane of the normal position of the truck-bolster B, the guide-columns are provided with bearings $g$ for rock-shafts E, which latter extend from side-frame to side-frame. Just next to the inner surface of the side-frames this shaft E is provided with horizontally disposed arms F, that extend under the bolster B, and have their ends curved upward and contacting with the underside of the same, and said shafts are also provided with upwardly projecting arms G at each end, which may, if desired, be made integral with arms F and, together therewith, form a bell-crank member. Vertical arms G are, preferably, shorter than arms F, and their upper ends are connected by rods H to the journal-boxes D, preferably, at points between the side-frames and the car-wheels; said journal-boxes being provided with lugs J on the side nearest the bolster, in about the same horizontal plane as shaft E, between which the adjacent end of said rod H is pivoted. About midway the height of the vertical end web $k$ of the side-frames, I provide sockets $k'$ for a comparatively small coiled spring K, whose other end normally bears and presses outward against the adjacent side of the journal-boxes, to restore them to their original positions next sleeve $d$, surrounding bolt $c$.

Each end portion of both side-frames of the truck are provided with a set of the above described devices for connecting the bolster to the journal-boxes, and when the bolster B is depressed, according to the weight supported thereon—whether that weight consists simply of the empty car-body, or of the loaded car—the journal-boxes, the axles X journaled therein, and the car-wheels automatically move toward the brake-shoes L.

The brake-shoes; the brake-shoe holders in which the same are secured, and the brake-beams upon the ends of which said holders are fastened, are constructed and operated just the same, as the standard braking mechanism now extensively in use, and when the wheels are moved nearer the brake-shoes, the braking pressure exerted by the latter will be proportionately increased. Thus the greater the depression of the bolster, B, by reason of the load carried thereby, the greater will be the pressure of the brake-shoes on the car-wheel; when, however, that maximum effective pressure of the brake-shoes against the car-wheels is reached that will almost stop the wheels from revolving, any further movement of the brake-shoes, will push the car-wheels away from the bolster and back toward their original position, and the journal-boxes, through the medium of the connecting-rods H, arms G and rock-shafts E, will move arms F upward, and correspondingly lift the truck-bolster, and thus the pressure exerted by the brake-shoes over and above said effective maximum braking pressure will expend itself in lifting the bolster and the load carried thereby.

In Fig. 4 I show a modification of my improved mechanism, as hereinbefore described, so as to utilize it in connection with car-trucks in which the brake-shoes are located and engage the car-wheels at points diametrically opposite the bolster. This modification consists of the same mechanism hereinbefore described excepting that the arms G' of the bell-cranks extend downward instead of upward as shown in Figs. 1 and 2 of the drawings. With this slight change when the arms F' are moved downward by the weight of the bolster B' and its load, the journal-boxes, through the medium of the connecting-rods H' will be pushed away from the bolster, and brought into closer juxtaposition with outside brake-shoes L', substantially as shown in said Fig. 4. The operation of this modification is identically the same, as that of the mechanism first described both as regards the obtaining of the effective maximum pressure of the brake-shoes is concerned, and the expenditure of the pressure above that point to lift the bolster and its load.

In Figs. 5 and 6 of the drawings, I show yet another modified construction of my invention to adapt it for use in connection with pedestal trucks. Fig. 5 shows the end 2 of the side-frame of a standard pedestal truck, which is, preferably, cast in one piece, but which may be made in any manner desired. The journal-box 3 supports the ends of these side-frames through the medium of springs 4, the lower ends of which latter rest upon a plate 5, which in turn rests upon anti-friction bars, having a limited rotation upon the upper flat top of said journal-box. The jaw, or space between the pedestal horns 7, is wider than the journal-box, to the extent of the lateral or transverse motion it is desired to permit said journal-box to have, and the inner vertical surface of the outer horn 7, is provided with one or more recesses 8 therein, the top of which is inclined its entire length at an angle of, say, 45 degrees. The opposing vertical wall of the opposite horn 7 is provided with corresponding recesses 9, 9, whose bottom is inclined at an angle corresponding to the upper side of recesses 8. The journal-box 3 is provided with lugs or projections 10, that project laterally therefrom and enter the recesses 8, and their upper edges correspond to the inclined edges of said recesses and are engaged thereby. The inner side of the journal-boxes are likewise provided with transverse projections or lugs 12, whose under surfaces are inclined, corresponding to the incline of the bottom of the recesses 9, but these lugs or projections 12, 12, project in a plane slightly below the plane of the opposite projections 10, and when the journal-boxes are kept normally bearing against the outer horn 7 of the jaw of the pedestal by interposed flat springs 13 so disposed as not to interfere with the engagement of projections 12 with recesses 9. Now the weight of the car-body and its load, which is sustained, through the medium of suitable transoms, by the side-frames 2, depress said side-frames, which causes the engagement of the inclined surfaces of the recesses 8 against the inclined surfaces of the lugs or projections 10 and moves the journal-box toward the center of the side-frame, and, consequently brings the treads of the car-wheels nearer the brake-shoes. The effect of this construction is the same as in the preferred construction of my invention, hereinbefore described, and, therefore the operation thereof need not here be repeated.

In Fig. 6 of the drawings I show the same mechanism as is shown and described in connection with Fig. 5, except that the positions of the recesses in the horns of the pedestal, and the projections or lugs of the journal-box engaged thereby are reversed. The construction of my invention shown Fig. 6 is for the purpose of moving the wheels toward the ends of the truck so as to coöperate with brake-shoes that engage the tread of the same at points farthest from the center of the truck.

What I claim as new is:—

1. Brake equalizing mechanism for cars comprising braking apparatus, and a pair of car wheels movable transversely to their axis.

2. Brake equalizing mechanism for cars comprising braking apparatus, and a pair of car wheels automatically adjustable to and from the brake element of said apparatus.

3. Brake equalizing mechanism for cars comprising the braking apparatus, a suitable car-truck, and wheels therefor having a movement independent of said car-truck to and from the contacting brake element of said apparatus.

4. Brake equalizing mechanism for cars comprising the braking apparatus, a suitable car-truck, and wheels therefor that are automatically adjustable to and from the contacting brake element of said apparatus independent of said car-truck.

5. Brake equalizing mechanism for cars comprising braking apparatus, a pair of car-wheels and axle therefor, journal-boxes for said axle, and means actuated by the load for moving said journal-boxes to and from the brake element of said apparatus independent of the medium through which the weight of said load is transmitted to said boxes.

6. Brake equalizing mechanism for cars comprising braking apparatus, a car-truck, car wheels and axles therefor, journal boxes for said axles movable horizontally independently of the car-truck frame, and means actuated by the load sustained by said truck for moving said journal-boxes to and from the contacting brake element of said apparatus.

7. Brake equalizing mechanism for cars comprising braking apparatus, a car-truck having a bolster, springs and side-frames supporting the same, car-wheels and axles therefor, journal-boxes for said axles, and means actuated by the vertical movements of said bolster for moving said journal-boxes horizontally in said side-frames to and from the contacting brake element of said apparatus.

8. Brake equalizing mechanism for cars comprising braking apparatus, a car-truck consisting of a bolster, springs, side-frames having longitudinal guide-ways in its ends, journal-boxes movable transversely in said guide-ways, car wheels and axles therefor journaled in said boxes, and means actuated by the vertical movements of said bolster for moving said journal-boxes in said guide-way toward and from the contacting brake element of said apparatus.

9. Brake equalizing mechanism for cars comprising braking apparatus, a car-truck consisting of a bolster, springs and side-frames, car-wheels and axles, journal boxes therefor, means actuated by the vertical movements of said bolster for adjustably moving said journal-boxes toward the contacting brake element of said apparatus, and devices for automatically returning said journal-boxes to their normal position.

10. Brake equalizing mechanism for cars comprising braking apparatus, a car truck consisting of a bolster, springs therefor, side-frames, car wheels and axles, journal boxes therefor, and means simultaneously actuated by the vertical movements of said bolster on both sides of said truck for adjustably moving said journal boxes toward the contacting brake element of said apparatus.

11. Brake equalizing mechanism for cars comprising braking apparatus, a car-truck consisting of a bolster, springs therefor, side-frames, car wheels and axles, journal boxes therefor, and bell cranks supported by said side-frames having the horizontal arms thereof engaged by said bolster, and links connecting the vertically disposed arms of said bell-crank to said journal boxes and adapted to move said journal boxes toward and from the contacting braking element of said apparatus.

12. Brake equalizing mechanism for cars comprising braking apparatus, a car truck consisting of a bolster, springs and side-frames, car-wheels and axles, journal boxes therefor, rock shafts the ends of which are journaled in said side-frames, a bell-crank secured thereto, the horizontal arms of which engage said bolster, and links connecting the vertically disposed arms thereof to said journal boxes and adapted to move the same toward and from the contacting brake element of said apparatus.

13. In a brake equalizing mechanism a car truck having side-frames having openings therein in which the journal boxes are placed and adapted to move transversely to the axis of the bearings therein independently of said side-frames.

14. In a brake equalizing mechanism a car truck having side-frames having longitudinally disposed openings therein in which the journal boxes are placed and adapted to move transversely to the axis of the bearings therein independently of said side-frames.

15. In a brake equalizing mechanism a car truck having side-frames having longitudinally disposed openings, the upper and lower opposing edges of the jaws of which constitute guides, and journal boxes having transverse lugs projecting from its top and under-side, which are adapted to be placed in said opening and have the lugs thereof engage said guides to direct the transverse movement thereof independent of said side-frames.

In testimony whereof I have hereunto set my hand and seal.

FRANK D. THOMASON. [L. S.]

Witnesses:
O. M. WERNICK,
M. E. MARTIN.